United States Patent
Vora

(10) Patent No.: US 6,282,534 B1
(45) Date of Patent: Aug. 28, 2001

(54) REVERSE CONTENT INDEXING

(75) Inventor: Sanjay V. Vora, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/039,166

(22) Filed: Mar. 13, 1998

(51) Int. Cl.[7] .................................................. G06F 17/30
(52) U.S. Cl. ........................................ 707/3; 707/4; 707/5
(58) Field of Search ................... 706/11, 50, 52, 706/53, 59, 45; 707/4, 5, 512, 3

(56) References Cited

U.S. PATENT DOCUMENTS

| | | | | |
|---|---|---|---|---|
| 4,884,218 | * | 11/1989 | Agnew et al. ........................ | 706/50 |
| 5,239,617 | * | 8/1993 | Gardner et al. ....................... | 706/11 |
| 5,255,386 | * | 10/1993 | Prager ................................... | 707/5 |
| 5,307,446 | * | 4/1994 | Araki et al. ........................... | 706/59 |
| 5,574,828 | * | 11/1996 | Hayward et al. ..................... | 706/45 |
| 5,737,739 | * | 4/1998 | Shirley et al. ....................... | 707/512 |
| 5,797,135 | * | 8/1998 | Whalen et al. ....................... | 706/53 |
| 5,809,493 | * | 9/1998 | Ahamed et al. ...................... | 706/52 |
| 5,909,679 | * | 6/1999 | Hall ....................................... | 707/4 |
| 6,035,292 | * | 3/2000 | Matsushita et al. .................. | 706/45 |
| 6,098,061 | * | 8/2000 | Gotoh et al. .......................... | 706/50 |
| 6,173,276 | * | 1/2001 | Kant et al. ............................ | 706/50 |

OTHER PUBLICATIONS

Barnard et al., "Adaptive leadership SM, sustaining global competitiveness through business planing SM", IEEE, 1997, pp. 72.*

* cited by examiner

*Primary Examiner*—Wayne Amsbury
*Assistant Examiner*—Thuy Pardo
(74) *Attorney, Agent, or Firm*—Blakely, Sokoloff, Taylor & Zafman LLP

(57) ABSTRACT

A method for generating knowledge base entries by using a programmed computer with access to said knowledge base is disclosed. In one embodiment, after information is collected from content providers, the present invention attempts to generate questions which relate to the collected information. Such questions are presented to a non-expert user in view of received information. If the information does not answer the generated questions, the user modifies the questions so that the information becomes the solutions to them. Then these questions and solutions pairs are entered into the knowledge base.

12 Claims, 6 Drawing Sheets

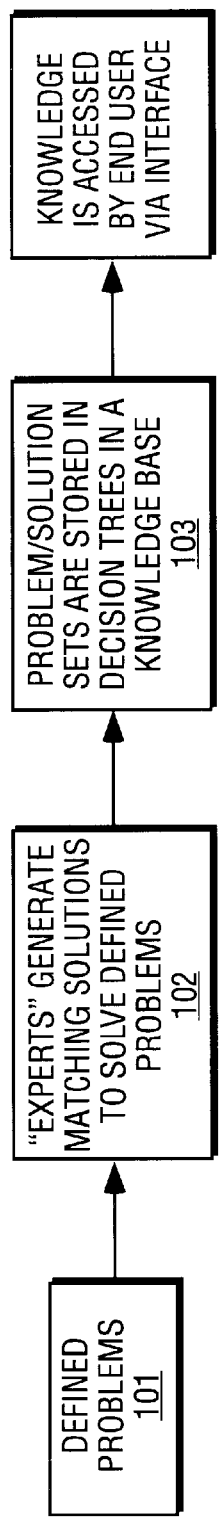
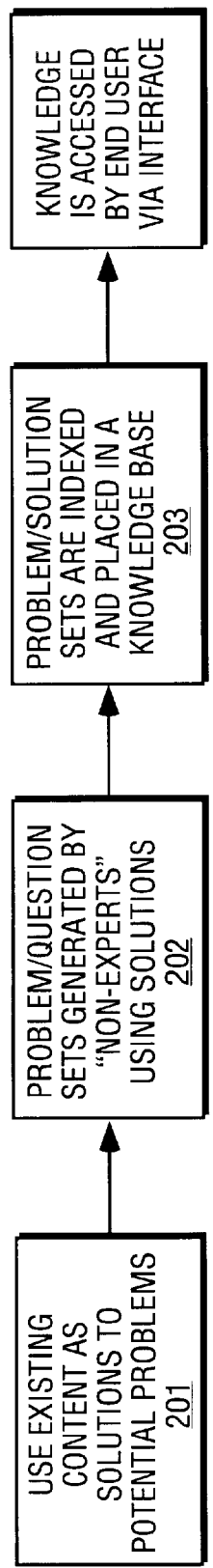
FIG. 1 (PRIOR ART)
FIG. 2

EXAMPLES OF REVERSE CONTENT INDEXING

*MICROSOFT ACCESS 7.0 TIP*

EASY DUPING

TO DUPLICATE A DATABASE OBJECT QUICKLY WITHOUT USING COPY/PASTE, DRAG AND DROP IT WITHIN THE DATABASE WINDOW WHILE PRESSING THE CTRL KEY.

301

MATCHING PROBLEM

"HOW DO I COPY A DATA BASE OBJECT IN ACCESS?"

EXAMPLE OF A HTML FILE (CORRESPONDING TO 301 IN FIGURE 3)

```
<HTML>
<HEAD>                              501                                           502
<TITLE>Microsoft Access 7.0 Tip<TITLE>
</HEAD>
<BODY>  503                  504
<H1>Easy Duping</H1>
<P>      505      507
To duplicate a database object quickly without using Copy/Paste, drag
and drop it within the database window while pressing Ctrl key.           508
         506
<P><HR>
</BODY>
</HTML>
```

FIG. 5

REVERSE CONTENT INDEXING

FIELD OF THE INVENTION

The present invention relates generally to building databases, and more particularly to building knowledge bases which provide users means to access information which solves users' specified problems.

BACKGROUND OF THE INVENTION

Today's internet search engines perform poorly when trying to solve a user's problem. For example, a user may have a problem such as "what should I do when the printout from my laser printer has faded?" Using a standard search engine, the top results probably would identify content containing words such as "printout", "laser", "printer" or "faded", but most likely would not adequately answer the user's problem.

A more efficient and accurate search method than the aforementioned method makes use of knowledge bases. More specifically, knowledge bases provide users means to access information that helps them solve a problem through some decision tree format or some logic steps. Using the previous user question as an illustration, the user may first look under "Printer Problems" in the knowledge base. Under "Printer Problems", an entry for "What to do" may exist. Then under the "What to do" heading, a "printout fading" subheading may exist and contain the answer to the user's question.

Knowledge bases are often built with known problems and then having human experts create particular solutions according to the problems. After the solutions become available, the problems and the solutions are organized and entered into databases. Because knowledge bases contain and provide accurate and consist information in a cost-effective manner, many corporations today have incorporated these knowledge bases into their daily operations. Some examples are: MIS support, customer support, payroll support, etc.

Although many tools exist in the marketplace today to help companies construct their knowledge bases, knowledge bases are inherently expensive and complicated to build because of their reliance on human experts and their inability to anticipate problems. For instance, one existing building tool constructs knowledge bases by first categorizing problems, solutions and causes into "objects". After the "objects" have been generated, a user of this tool can establish links among selected objects using a graphical user interface. By connecting these objects, the tool generates a knowledge base according to the user's defined linkages. Despite the ease of use aspect of such a tool, the "objects" still need to be created separately. More particularly, the "solution or cause objects" are generated by human experts. Such experts not only need to be familiar with the subject matter in question, but also need to know the problem prior to formulating the corresponding answer. On the other hand, the "problem objects" are often generated from customer support organizations. Since the problems often come from actual customer feedback, the occurrence of these problems is neither anticipatory nor predictable. Consequently, synchronizing the effort of obtaining the problems first and then having the experts investigate them can be difficult and costly.

SUMMARY OF THE INVENTION

A method for generating knowledge base entries by using a programmed computer with access to said knowledge base is disclosed. In one embodiment, after information is collected from content providers, the present invention attempts to generate questions which relate to the collected information. Such questions are presented to a non-expert user in view of received information. If the information does not answer the generated questions, the user modifies the questions so that the information becomes the solutions to them. Then these questions and solutions pairs are entered into the knowledge base.

BRIEF DESCRIPTION OF THE DRAWINGS

The present invention is illustrated by way of example and is not limited by the figures of the accompanying drawings, in which like references indicate similar elements, and in which:

FIG. 1 illustrates a block diagram of a prior art method or process for generating knowledge bases.

FIG. 2 illustrates a block diagram for the present invention.

FIG. 3 illustrates an example of how the present invention can be used.

FIG. 5 illustrates a sample HTML file which corresponds to box 301 in FIG. 3.

DETAILED DESCRIPTION

Figure 4:
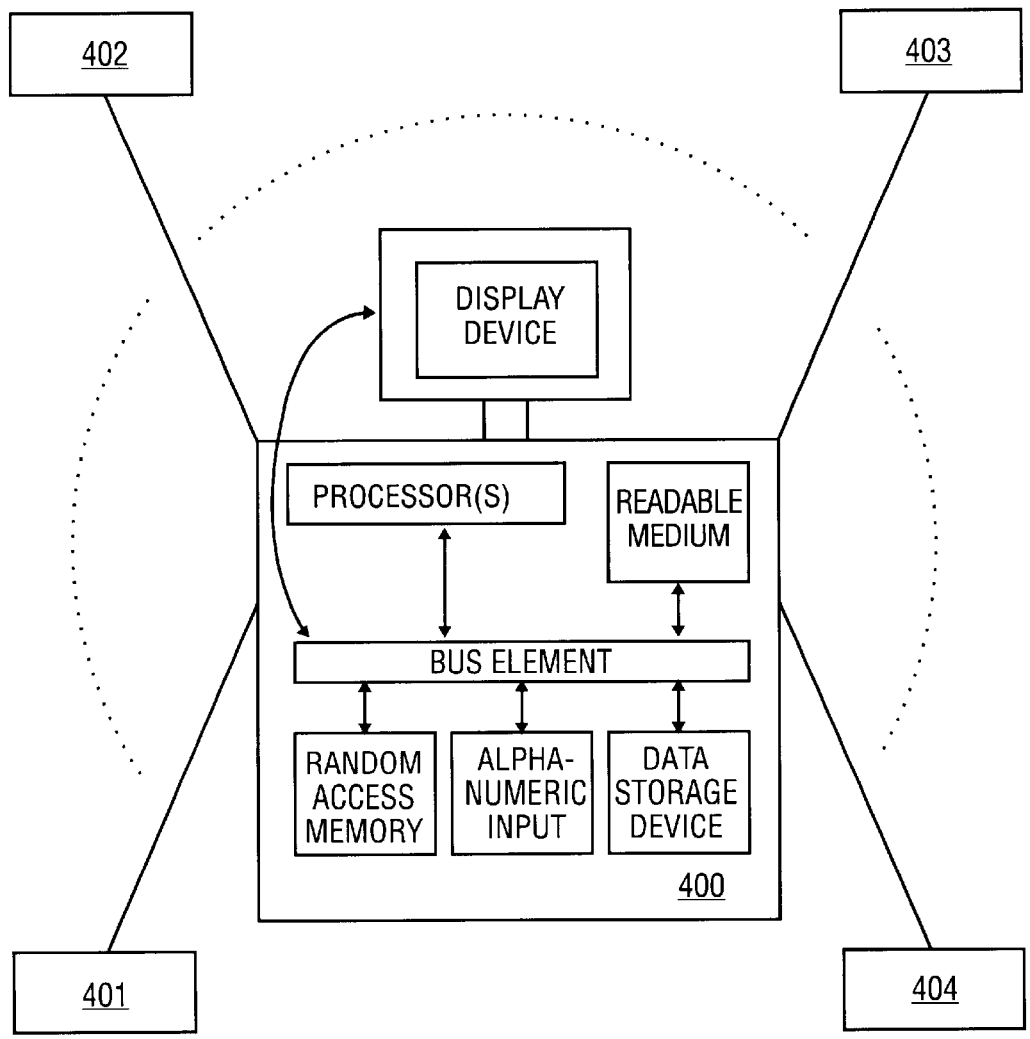
FIG. 4 illustrates the configuration of one embodiment of the present invention.

A method and apparatus for generating knowledge bases is disclosed. In the following description, numerous specific details are set forth such as particular content and information flow in order to provide a thorough understanding of the present invention. However, it will be apparent to one of ordinary skill in the art that the invention may be practiced without these particular details. In other instances, well known elements such as databases, knowledge bases, web sites, URLs, HTML and the internet have not been explained in special details in order to avoid unnecessarily obscure the present invention.

FIG. 1 illustrates a block diagram of a prior art method for generating knowledge bases. The process requires human experts to first read and understand the defined problems 101. Then the experts formulate the corresponding solutions in block 102. Once solutions are available, some efforts are needed, most likely from the experts again, to create a decision tree to place the newly formed problem/solution pairs in block 103. The resulting knowledge base can then be accessed by end users.

FIG. 2 demonstrates a block diagram of the present invention. Instead of starting with questions which need to be resolved, the present invention begins with information from content providers such as news agencies, publishers of periodicals, newspapers and technical journals. Unlike the prior art method which generates a solutions each time a question is raised, the present invention makes use of the existing information from various mentioned providers in block 201. In block 202, non-expert users review the available information and construct questions that can be answered by such information. An example of this process is shown in FIG. 3. Lastly, block 203 allows users to enter the newly generated problem/solution combinations into a knowledge base.

Moreover, since the invention at hand makes use of information which is already available and does not need experts' assistance, a large knowledge base can be created at a cost significantly lower and at a much faster pace than the prior art knowledge base generation. Further, the quality of the solutions in the present invention will most likely to be very high, because the sources of these solutions are often from the manufacturers and inventors of the products, or experts who've published articles in specialized fields. Finally, the invention at hand builds in the flexibility of having a solution which resolves multiple user problems within the knowledge base. Such a feature is appreciably more complicated to do in the prior art knowledge base generation.

FIG. 3 describes an example result where the present invention is used. More particularly, 301 represents a tip from Windows Magazine Winter 1997—2,001 Issue. Although 301 may seem to possess little value to the end consumer at the first glance, block 302 is created by using the present invention. As a result, block 301 and block 302 can pair up and reside in a knowledge base.

It should be noted that FIG. 2 illustrates the block diagram for the invention at hand having been programmed in a general purpose computer. Such a computer system architecture of the preferred embodiment of the present invention is further illustrated in FIG. 4 and comprises a bus element for communicating information, a processor coupled with said bus element for processing information, a random access memory coupled with said bus element for storing static information and instructions for said processor, a data storage device such as a magnetic disk and disk drive coupled with said bus element for storing information and instructions, a readable medium such as a floppy disk or a CD coupled with said bus element for retrieving information and instructions for said processor, a display device coupled to said bus element for displaying information to the computer user and an alphanumeric input device coupled to said bus element for communicating information and command selections to said processor. Additionally, this programmed computer 400 is connected to various content providers (401–404) through some network connections.

Operation of the Present Invention

The current invention is a method and apparatus for generating knowledge bases. One embodiment of the invention is a computer program containing a number of modules or source code segments. A block diagram of a typical assembly of modules or source code segments is demonstrated in FIG. 6. Generally, source code segment 601 represents an information collector, which receives and maintains information from content providers. The collected information is passed on to question generator segment 602. Question generator 602 is responsible for parsing the information from information collector 601 and creating questions according to the parsed information. After questions have been formulated, they are presented to non-expert user 600 through user interface segment 603. Additionally, user interface 603 allows users to modify question generator 602's generated questions to better relate to the parsed information. User interface 603 also permits users to group modified questions to their corresponding solutions and to input such questions and solutions combinations into an appropriate knowledge base.

In the preferred embodiment of the present invention, information collector 601 maintains content providers' information by establishing direct links to their sources. For example, when a knowledge base on "printers" is desired, information collector 601 obtains related content providers' web site locations, or the Uniform Resource Locator (URL), containing data on "printers". Information collector 601 can either search on keywords using popular internet search engines, such as Yahoo or Lycos, or make use of previously arranged contractual relationships with the content providers to obtain the appropriate URLs. Once the content providers and their URLs are identified, information collector 601 holds onto the URLs.

When question generator 602 is ready to process "printers" contents, 602 accesses the information by linking to the previously obtained and preserved URLs from information collector 601. Question generator 602 is further subdivided into content parser 604 and parsed content interpreter 605. Content parser 604 processes various content providers' information and attempts to capture the essential portions of that information; whereas parsed content interpreter 605 is responsible for formulating questions based on the output of content parser 604.

In this embodiment, the filtering mechanism is triggered by examining "tags" in the incoming file, where tags indicate different sections such as titles, headings or paragraphs within the file. One such file is illustrated in FIG. 5. More specifically, the title section is marked by title tags 501 and 502. The heading section is marked by heading tags 503 and 504. Similarly, the paragraph section is marked by paragraph tags 505 and 506. When the incoming file is retrieved from content providers using the URLs from information collector 601, the incoming file is likely to be in HTML format such as the one described in FIG. 5 or some other type of tagging format. Content parser 604 then utilizes the tags to differentiate between various sections within the file. Using FIG. 5 as an illustration, content parser 604 performs a standard string comparison on heading tags 503 and 504 and paragraph tags 505 and 506 throughout the file. After the heading and the paragraph tags are identified, content parser 604 proceeds to filter out the rest of the file and retain only the heading and paragraph sections. The retained tag information and the retained paragraph information are then both sent to parsed content interpreter 605. In other words, heading tags 503, 504 and heading content 507 and paragraph tags 505, 506 and paragraph content 508 are all passed onto 605.

Content parser 604 also has additional logic to retain only the paragraphs immediately following the headings and match said paragraphs to said headings. For example, if multiple headings and multiple paragraphs exist in a file, content parser 604 is capable of maintaining each heading with its corresponding paragraphs individually and sending the properly ordered information to parsed content interpreter 605.

Parsed content interpreter 605 examines its incoming data and interprets them according to their respective tags. Again using FIG. 5 as an illustration, 605 first identifies heading tags 503 and 504 and then transforms heading content 507 into a "question" by simply adding a question mark after heading content 507. In a similar fashion, 605 recognizes the corresponding paragraph tags 505 and 506 and converts paragraph content 508 into a "answer" by copying the entire 508 verbatim. After the question and the answer are formulated, interpreter 605 presents the question and answer pair to non-expert user 600 through user interface 603. In the present example, interpreter 605 presents user 600 "Easy Duping?" as a question with a solution of "To duplicate a database object quickly without using Copy/Paste, drag and drop it within the database window while pressing the Ctrl key". Although a particular type of parsing and interpreting scheme is described, other similar methods can be applied in interpreter 605 without exceeding the scope and spirit of the present invention.

As has been demonstrated, question generator 602 often does not produce the correct questions in view of the generated answers. However, these attempted questions provide useful clues to form more pertinent questions. More specifically, user interface 603 presents question generator 602's output questions to non-expert user 600. The presentation is made through an interactive graphical user interface and input/output device 606. Device 606 can be a mouse, a keyboard or any input/output device which is capable of adequately delivering the necessary information from user 600 to interface 603 and vice versa. User 600 reviews the questions with proposed solutions and determines whether to enter such questions/solutions combinations into the destination knowledge base or to tailor the questions to fit the proposed solutions. Not only is user 600 permitted to alter the presented questions, but he or she is also allowed to rewrite entire questions or enter multiple questions for each presented solution. Once a decision is finalized, user 600 passes on the questions and solutions to question/solution matcher 607.

Matcher 607 simply matches questions with solutions and organizes them in a recognizable form to entry generator 608. It should be noted that questions and solutions from device 606 are not restricted to arrive at matcher 607 simultaneously. Further, each solution may answer multiple questions. Matcher 607 thus has additional responsibilities to closely track its incoming data and make certain that correct questions are matched up with the appropriate solutions. One tracking method assigns a numerical value to each question and solution pair. When Match 607 receives user 600's modifications, it will also have the corresponding numerical value and proceed to organize the newly modified question(s) and solution pair accordingly.

Once questions and solutions have been paired up and organized, they are passed on to entry generator 608. Entry generator 608 prepares and tailors entries containing the question/solution combination to the type of database the present invention is accessing.

Figure 7:
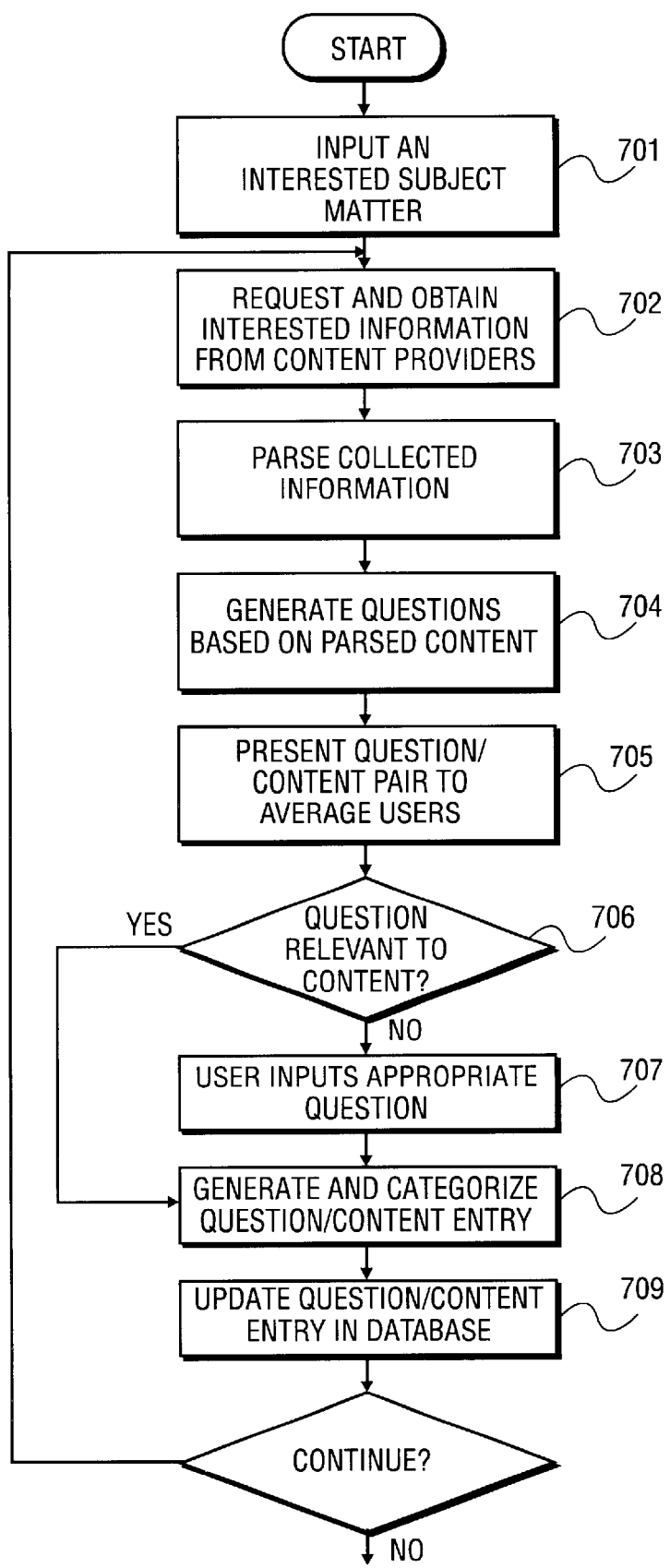
FIG. 7 illustrates a flow chart of one embodiment of the present invention.

In additional to the previously described block diagrams, FIG. 7 illustrates a flow chart which details operations in the preferred embodiment of the present invention. More specifically, this embodiment begins with an interested subject matter in 701. Subject matters such as "printers" determine the content of the knowledge base. As has been discussed earlier, after knowing what type of knowledge base is intended, appropriate content providers are identified and are linked to in 702. Needed URLs to content providers' sources are requested and obtained. With these URLs, information can be retrieved by simply connecting to the content providers' sources through either the internet or intranet. One example of using the intranet would be: if the knowledge base is for employees in the corporation and the content provider is said corporation's finance department, the use of intranet is most likely desired.

After information retrieval, the data are parsed in 703 based on the existent tags in them. Tags are common in HTML files such as the one in FIG. 5. For file formats that do not support tagging, developers using this particular embodiment of the present invention may negotiate with necessary content providers to supply pre-determined tags. Alternatively and as has been emphasized previously, other filtering and parsing schemes can be adopted in the present invention depending on content providers' file formatting specifications. Regardless of which filtering mechanism is in place, the parsed content are used to generate questions in 704. The questions often are simply the headings or the titles of the received documents.

After the completion of 704, the proposed questions and solutions are presented to a non-expert user in 705. Since this user is not an expert, the cost of hiring and maintaining him is likely to be low. The user is asked in 706 to determine whether the solutions answer the proposed questions. If they do not, the user can modify the questions by altering certain words and phrases, or rewriting the entire questions or even generate multiple new questions. When the solutions answers the modified questions, they are all sent to 708 for further organization. However, if the proposed questions can be answered by the solutions from 705, then they are both directly sent to 708 from 706. 708 tracks all the incoming questions and solutions and organizes and formats them to satisfy different database's requirements. More specifically, if one solution answers three questions, 708 groups and formats all of them in one database entry. When entries are in desired formats, they are inputted into the designated database in 709.

Alternative Embodiment Considerations

Figure 6:
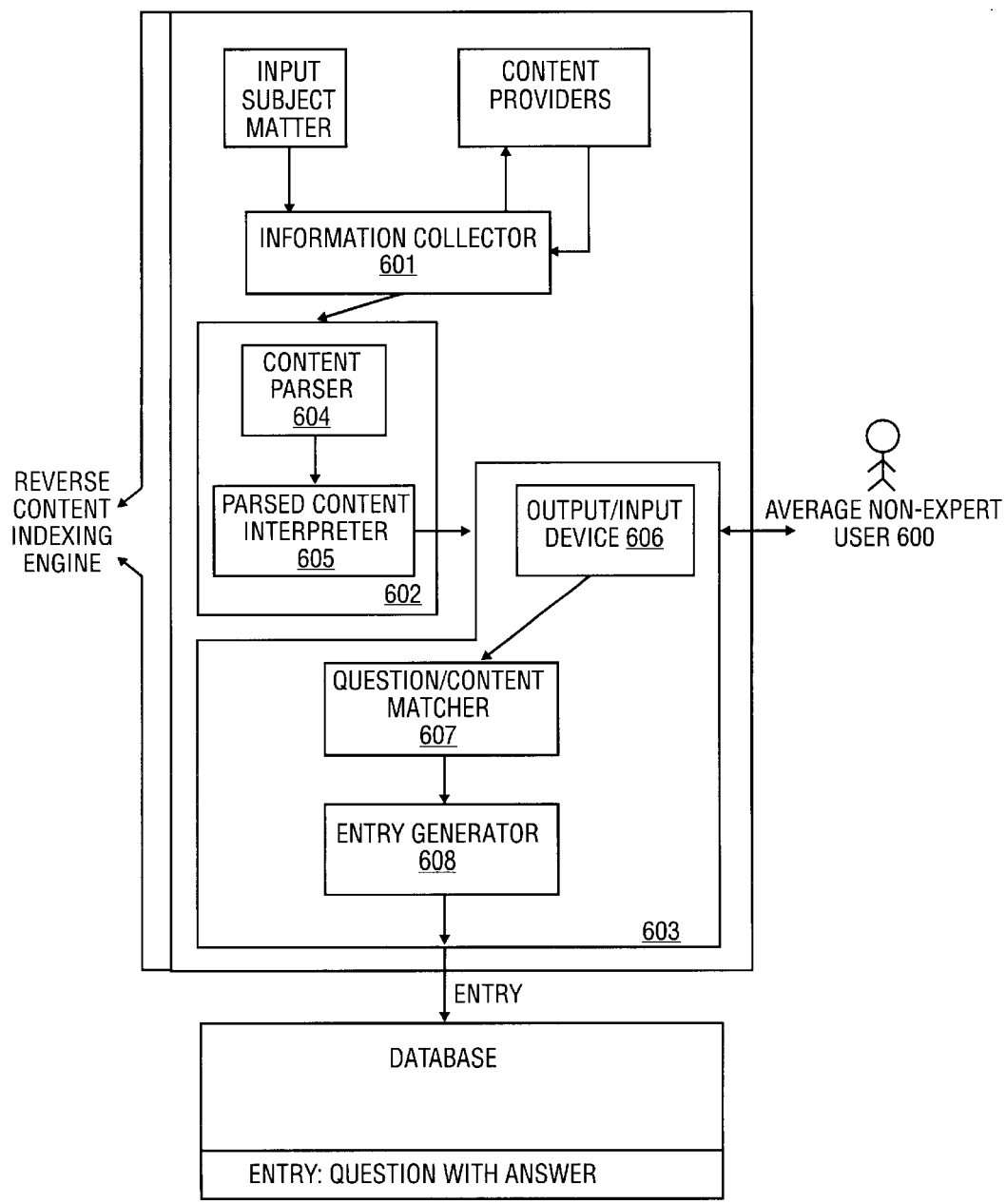
FIG. 6 illustrates the different components of one embodiment of the present invention.

Each of the source code segments illustrated in FIG. 6 and discussed in the previous paragraphs are deliberately designed to be modular and portable. Thus, they are not restricted to be programmed in any particular type of computer programming language. They can be implemented in different platforms depending on the design requirements and the applications of the present invention.

Additionally, each of the source code segments can be implemented using different methods than the ones disclosed above without exceeding the scope and spirit of the present invention. For example, although one with ordinary skill in the art can design a more elaborate question generator 602 and attempt to produce questions which closely match the retrieved content without any human intervention, such a feature is not required in the invention at hand. Since one of the main advantages of the present invention is its cost effectiveness, the required time and cost associated with the design and implementation of such a complex generator will likely frustrate such a purpose in the present invention. Another method of building a more intelligent question generator is having content providers insert additional tags in their files. The tags do not need to conform to HTML standards as long as they are agreed upon between the provider and the knowledge base builder.

Also, alternative methods of filtering out desired information and sending such filtered information to parsed content interpreter 605 are available and should be apparent to one of ordinary skill in the art. One alternative is that instead of sending the entire tag and paragraph information such as 503, 504, 505, 506, 507 and 508 to 605, content parser 604 can choose to translate the tags 503, 504, 505 and 506 to numerical values and transmit the values to interpreter 605 instead. Another method would be to combine the functionality of content parser 604 and parsed content interpreter 605.

Thus, a method and process for generating entries in knowledge base has been disclosed. Although the present invention has been described particularly with reference to the figures, it will be apparent to one of the ordinary skill in the art that the present invention may appear in any of a number of database or knowledge base building systems. It is contemplated that many changes and modifications may be made by one of ordinary skill in the art without departing from the spirit and scope of the present invention.

What is claimed is:

1. A method for generating entries of a knowledge base, the method comprising:

a. collecting tagged information from content providers by linking to content providers' information sources, obtaining information from said sources and maintaining said collected tagged information;

b. parsing said tagged information and automatically generating a question from said parsed information; and c. providing a user interface for review of said automatically generated question, said user interface to allow modification of said automatically generated question so that said parsed information becomes a solution to said automatically generated question, said interface further to enable entry of said modified automatically generated question and said solution into said knowledge base.

2. A machine readable medium having embodied thereon instructions, which when executed by a machine, causes said machine to generate entries to a knowledge base, wherein said instructions comprising:

a. an information collector source code segment comprising receiving information from content providers and maintaining received information;

b. a question generator source code segment comprising parsing received information and generating a question that relates to the parsed information; and c. a user interface source code segment comprising outputting a computer generated question with the parsed information; allowing modification of said question so that said information becomes a solution to said question; and entering the modified question with said solution as entries into said knowledge base.

3. The machine readable medium according claim 2, wherein said information collector source code segment in (a) requires content providers to supply various tags which differentiate one portion of information from another to said information collector source code segment.

4. The machine readable medium according to claim 2, wherein said information collector source code segment in (a) establishes direct links to content providers' information sources.

5. The machine readable medium according to claim 3, wherein said question generator source code segment in (b) generates a question based on content providers' supplied tags.

6. The machine readable medium according to claim 2, wherein said user interface source code segment in (c) allows a non-expert user review said generated question in view of said information.

7. A machine readable medium having embodied thereon instructions, which when executed by a machine, causes said machine to generate entries to a knowledge base, wherein said instructions comprising:

a. an information collector source code segment comprising establishing direct links to content providers' information sources, receiving tagged information from content providers and maintaining received information;

b. a question generator source code segment comprising parsing received tagged information and generating a question according to content providers' supplied tags; and c. a user interface source code segment comprising outputting a computer generated question with the parsed information; having a non-expert user review said generated question in view of said information; when necessary, having said user modify said question so that said information becomes solutions to said question; and having said user enter the modified questions with said solution as an entry into said knowledge base.

8. A computer system with access to a knowledge base, comprising:

a. an information collector to collect information from content providers;

b. a question generator to automatically generate a question from said collected information; and c. a user interface to allow a user to modify said automatically generated question so that said collected information becomes a solution to said automatically generated question and to enter said modified automatically generated question with said solution into said knowledge base.

9. The computer system according to claim 8, wherein said content providers supplies various tags which differentiate one portion of information from another.

10. The computer system according to claim 8, wherein said information collector comprises linking to content providers' information sources, obtaining information from said sources and maintaining said collected information.

11. The computer system according to claim 9, wherein said question generator parses content providers' supplied information and generates a question based on their tags.

12. A computer system with access to a knowledge base, comprising:

a. an information collector to collect tagged information from content providers by linking to content providers' information sources, obtaining information from said sources and maintaining said collected tagged information;

b. a question generator to parse said tagged information and to automatically generate a question from said parsed information;

c. a user interface for review of said automatically generated question; and d. said user interface to allow modification of said automatically generated question so that said parsed information becomes a solution to said automatically generated question and to enable entry of said modified automatically generated question with said solution as an entry into said knowledge base.

\* \* \* \* \*